United States Patent [19]

Levers

[11] Patent Number: 5,319,293
[45] Date of Patent: Jun. 7, 1994

[54] APPARATUS AND METHOD FOR CONTROLLING A WINDSHIELD WIPING SYSTEM

[75] Inventor: Juergen Levers, Bochum, Fed. Rep. of Germany

[73] Assignee: Leopold Kostal GmbH & Co., Fed. Rep. of Germany

[21] Appl. No.: 988,774

[22] Filed: Dec. 10, 1992

Related U.S. Application Data

[63] Continuation-in-part of Ser. No. 989,052, Dec. 10, 1992.

[51] Int. Cl.$^5$ ............................................. G05B 11/32
[52] U.S. Cl. .............................. 318/483; 318/DIG. 2
[58] Field of Search ............... 318/DIG. 2, 119–134, 318/DIG. 2, 445, 456, 460, 483

[56] References Cited

U.S. PATENT DOCUMENTS

| Re. 33,848 | 3/1992 | Shiraishi | 318/DIG. 2 |
|---|---|---|---|
| 3,947,131 | 3/1976 | Karl | 356/209 |
| 4,481,450 | 11/1984 | Watanabe et al. | 318/DIG. 2 |
| 4,584,508 | 4/1986 | Kobayashi et al. | 318/DIG. 2 |
| 4,588,935 | 5/1986 | Kaneiwa et al. | 318/DIG. 2 |
| 4,595,866 | 6/1986 | Fukatsu et al. | 318/DIG. 2 |
| 4,798,956 | 1/1989 | Hochstein | 250/341 |
| 5,015,931 | 5/1991 | Muller | 318/DIG. 2 |
| 5,119,002 | 6/1992 | Kato et al. | 318/DIG. 2 |
| 5,140,234 | 8/1992 | Wallrafen | 318/DIG. 2 |

FOREIGN PATENT DOCUMENTS

| 3314770C2 | 11/1987 | Fed. Rep. of Germany . |
|---|---|---|
| 3722510A1 | 1/1989 | Fed. Rep. of Germany . |
| 277437A1 | 4/1990 | Fed. Rep. of Germany . |
| 3930732A1 | 3/1991 | Fed. Rep. of Germany . |
| 0438633A1 | 7/1991 | Fed. Rep. of Germany . |
| WO9107298 | 5/1991 | PCT Int'l Appl. . |

Primary Examiner—William M. Shoop, Jr.
Assistant Examiner—Brian Sircus
Attorney, Agent, or Firm—Brooks & Kushman

[57] ABSTRACT

An apparatus and method for use with a vehicular windshield wiping system, the apparatus recognizing various rain patterns and accordingly controlling the wiping system. The wiping system includes at least one windshield wiper, and the apparatus includes a sensor mounted to the windshield for monitoring a portion of the windshield wiped by the wiper during each wipe cycle. The sensor generates a signal having a value which varies as a coating collects on the monitored portion.

10 Claims, 2 Drawing Sheets

APPARATUS AND METHOD FOR CONTROLLING A WINDSHIELD WIPING SYSTEM

CROSS-REFERENCE TO RELATED APPLICATION

This application is a continuation-in-part of U.S. Pat. application Ser. No. 07/989,052, titled "Apparatus And Method For Controlling A Windshield Wiping System" filed Dec. 10, 1992, the specification of which is hereby expressly incorporated by reference in its entirety.

1. Technical Field

The present invention relates to windshield wiping systems and, more particularly, to an apparatus and method for controlling a windshield wiping system based on the quality and quantity of a liquid or solid coating present on the windshield.

2. Background Art

A device for controlling a wiper motor is disclosed in German patent DE 33 14 770 C2 and includes an optoelectronic sensor apparatus and a circuit arrangement connected to the drive motor, so that control of the drive motor may be effected in dependence upon the coating present on the windshield. The device does not however comprise any means allowing detection of the size of the rain drops hitting the windshield. Thus, the device may to some extent satisfactorily adapt the wiping cycle frequency automatically to quantitative changes arising during wiper operation in the condition of the coating on the windshield, such as, for example, the degree of dirt accumulation, the quantity of rain or snow striking the windshield.

However, because the measuring surface of the sensor apparatus is relatively small compared to the windshield, it is not possible with existing systems to satisfactorily achieve precise automatic adaptation of the wiping cycle frequency to the differing degree of impairment of visibility caused by the differing size of the rain drops striking the windshield. The vehicle operator therefore has the impression on the one hand that wiping is occurring too frequently and, on the other hand, that wiping is not occurring frequently enough.

SUMMARY OF THE INVENTION

It is therefore an object of the present invention to provide an improved apparatus and method for controlling a windshield wiping system.

It is a further object of the present invention to provide an apparatus and method for controlling a windshield wiping system based on the rain pattern (widely scattered large raindrops, finely dispersed small raindrops, or mixtures thereof) striking the windshield, without this requiring an increase in the size of the measuring surface of the sensor.

In carrying out the above objects and other objects and features of the present invention, an apparatus is provided for controlling a vehicular windshield wiping system including at least one windshield wiper. The apparatus includes a sensor mounted to the windshield for monitoring a portion of the windshield wiped by the wiper during each wipe cycle. The sensor generates a signal having a value which varies as a coating collects on the monitored portion. The apparatus further comprises detecting means for recognizing at least two rain patterns based on the rate of change in an amplitude of the sensor signal over a predetermined period of time, and means for activating the windshield wiping system for a wipe cycle according to the recognized rain pattern.

The advantages accruing to the present invention are numerous. For example, by detecting particular rain patterns, the windshield wiping system can be accurately controlled to wipe the windshield at appropriate intervals.

The above objects and other objects, features, and advantages of the present invention will be readily appreciated from the following detailed description of the best mode for carrying out the invention when taken in connection with the accompanying drawings.

BEST MODE FOR CARRYING OUT THE INVENTION

Figure 1:
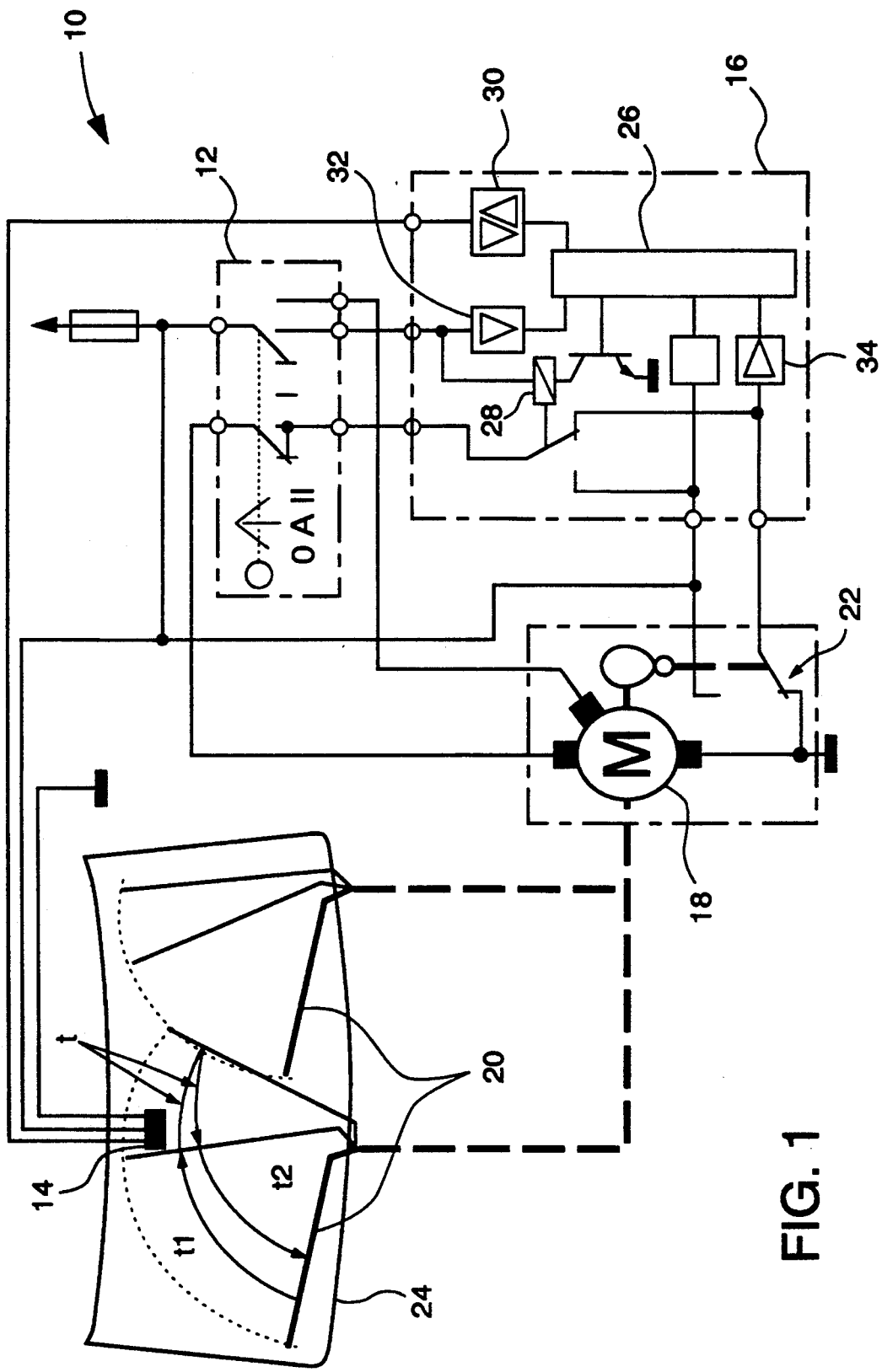
FIG. 1 is a block diagram of the windshield wiping system of the present invention.

Referring now to FIG. 1, there is illustrated an apparatus, shown generally by reference numeral 10, for controlling a windshield wiping system. As shown, the apparatus 10 includes a switch arrangement 12, an optoelectronic sensor 14 mounted to the inside surface of a windshield 24 and a circuit arrangement 16. The optoelectronic sensor 14 and the circuit arrangement 16 are activated via the switch arrangement 12. The motor 18 is activated by the microprocessor 26 via a wiper relay 28 based on signals from the optoelectronic sensor 14 and the switch arrangement 12. The optoelectronic sensor includes infrared beam transmitters for emitting beams and infrared beam receivers for receiving the emitted beams, which are modified based on the coating present on the windshield. The optoelectronic sensor 14 generates a signal, the value of which varies based on the presence of a coating, such as liquid or dirt, on the area of the windshield monitored by the sensor.

With continuing reference to FIG. 1, the sensor signal is provided to a microprocessor 26 which processes the signal and accordingly controls the windshield wiping system. It should be appreciated that although the windshield wiping system is shown to be controlled by a microprocessor, the system could also be controlled by an analog and/or digital switching system, or the like. Communication between the optoelectronic sensor 14 and the microprocessor is facilitated by serial interface/signal processing circuitry shown generally by reference numeral 30. Associated with the motor 18 is a switching contact device 22 enabling detection of the parked, or resting, position of the wipers 20, and the activation and deactivation signals of the motor 18 for determining the wiping system operating time. Although the wiping system shown includes two wipers, the present invention could also be utilized with a wiper system having more than, or fewer than, two wipers. The microprocessor 26 provides means for determining the last sweep of the wiper across the monitored portion, based on the operating time of the wiping system, as described in greater detail below. The microprocessor also provides means including at least two counter elements for detecting a plurality of rain patterns. As shown, signals from the switch arrangement 12 and the switch contact device 22 are processed by signal conditioning circuitry shown generally by reference numeral 32 and 34, respectively, prior to being received by the microprocessor.

With continuing reference to FIG. 1, to activate the windshield wiping system, the switch arrangement 12 is moved out of the OFF switch position (shown as "O") into the automatic switch position (shown as "A"). In the automatic switch position A, the intermittent and continuous wiping functions are combined in a speed stage I. The switch arrangement 12 may also be moved into the continuous wiping switch position II, in which the windshield wiping system is operated in a speed stage II.

When the switch arrangement 12 is moved into the automatic switch position A, a wiping cycle (t seconds in length) is triggered and an initial reference value is formed. If there is a coating (e.g. rain) on the outer surface of the windshield 24 when the automatic switch position A is selected, the wiping system is activated to clean the windshield and one of the windshield wipers 20 passes over the measuring range of the sensor 14 (i.e. the monitored portion of the windshield) twice during a wiping cycle t. If the circuit arrangement 16 detects a further coating that strongly impairs visibility (e.g. heavy rain) on the monitored portion of the windshield 24, based on the signals from the sensor apparatus 14 after the second sweep during a wiping cycle t, a new wiping cycle t is immediately started after the windshield wipers 20 have reached the parked position (at the end of wiping cycle t). However, if the circuit arrangement 16 detects a further coating that only slightly impairs visibility (e.g. light rain) on the windshield 24 after the second sweep during a wiping cycle t, after the windshield wipers 20 have reached the parked position, the wipers are held by the switching contact device 22 in the parked position for a specific length of time. The length of the time delay (tp) is updated after each wiping cycle in dependence upon the coating newly forming on the windshield 24 (e.g. rain intensity).

The coating newly forming on the windshield 24 may arise, on the one hand, as a result of a precipitation pattern of finely dispersed small droplets or, on the other hand, as a result of a precipitation pattern of widely dispersed large drops. Frequently, the vehicle operator finds a coating resulting from a rain pattern of a few scattered large drops on the windshield 24 more disturbing than a coating resulting from a rain pattern of finely dispersed small droplets. An added complication for the apparatus for controlling the windshield wiping system is that the probability of one of the few widely dispersed large drops falling onto that portion of the windshield monitored by the optoelectronic sensor 14 (which is relatively small compared to the remainder of the windshield) is much lower than the probability of a plurality of finely dispersed small droplets falling onto the monitored portion. Thus, it may happen that there are many widely dispersed, visibility-impairing large drops on the windshield 24 without a single drop falling onto the monitored portion of the windshield. To allow wiper operation nevertheless to be sensitively tuned to such differing rain forms, the circuit arrangement 16 preferably includes means, including two counter elements, for recognizing rain patterns. Most preferably, the microprocessor performs rain pattern recognition based on the sensor signal.

With continuing reference to FIG. 1, for evaluation, rain pattern acquisition is based on only the sensor signals generated by the optoelectronic sensor 14 during an acquisition period in which a preset rate of change in the sensor signal characteristic is exceeded. Preferably, the acquisition period is in each case the length of time which elapses from shortly after the second sweep of a windshield wiper 20 over the sensor 14 up to initiation of a new wiping cycle. For evaluation, the microprocessor 26 analyzes the amplitude of the sensor signal change.

Figure 2:
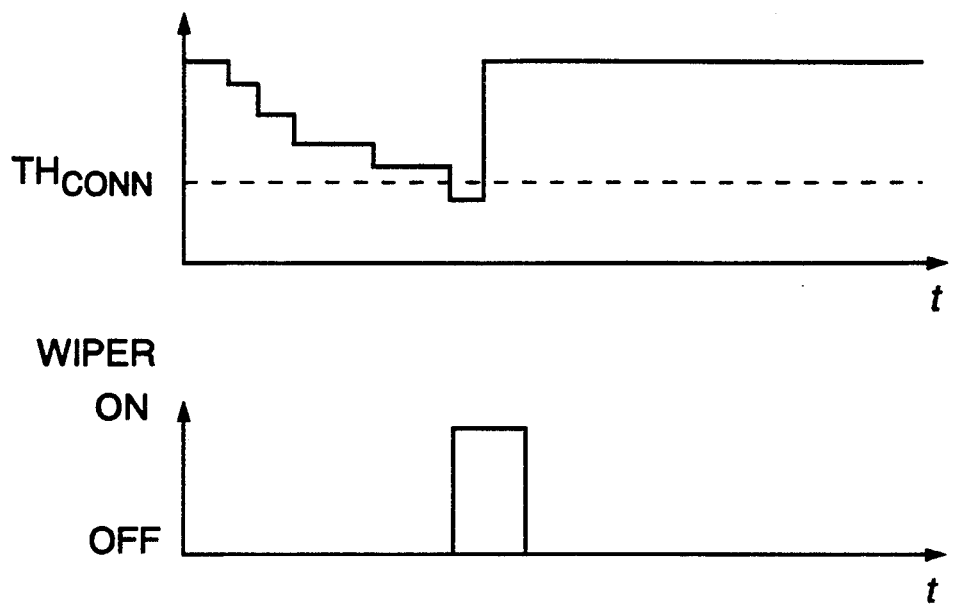
FIG. 2 is a graphical illustration of the signal characteristic representative of a specific rain pattern, including a graphical illustration of the associated windshield wiper action.

To distinguish the various rain patterns, the microprocessor splits the sensor signals into two categories, namely into signals whose amplitude of signal change lies above and below a fixed limit value over a predetermined period of time. In the preferred embodiment, this fixed limit value represents a value of 4 digits. If the change in the amplitude of the sensor signal has a magnitude which is less than the fixed limit value (i.e. the sensor signal value changes less than 4 digits in about 10 mS), a change in the value of one of the two counter elements is effected. Although a time of 10 mS is preferably utilized, many different times could be utilized without degraded performance. The sensor signal shown in FIG. 2 is a representative signal resulting from a precipitation pattern of many finely dispersed rain droplets. In the case of this finely dispersed pattern, there are shown to be a number (i.e. five) of smaller changes in the sensor amplitude, each of which is less than the fixed limit value. As a result, the value of the one of the two counter elements changes a corresponding number of times (i.e. five) during the defined acquisition period. Starting from the initial value zero, the one counter element is increased per relevant signal change by a unit increment, up to the value five. If, during this period, the sensor signal falls below the connection threshold for wiper operation $TH_{CONN}$ (the threshold for starting operation of the windshield wiper operation, shown in FIGS. 2 and 3), this leads to the triggering of a wiping cycle. After a wiping cycle so triggered, triggering of further new wiping cycles depends exclusively upon the subsequently arising signal emitted by the sensor 14. In other words, if the signal subsequently falls once more below the connection threshold for wiper operation, a new wiping cycle will also be triggered. However, if the signal does not fall below the connection threshold, then no new wiping cycle will be initiated.

Figure 3:
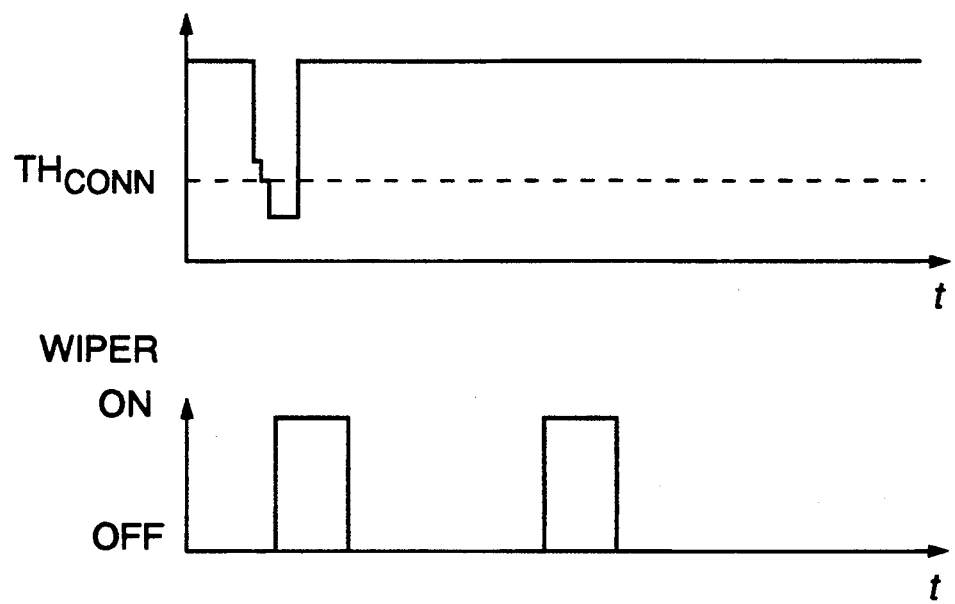
FIG. 3 is a graphical illustration of the signal characteristic representative of a further specific rain, including a graphical illustration of the associated windshield wiper action.

Referring now to FIG. 3, if the change in the amplitude of the sensor signal has a magnitude which exceeds the fixed limit value (i.e. the change in the sensor signal exceeds 4 digits in about 10 mS ), a change in the value of the other of the two counter elements of is effected. The sensor signal shown in FIG. 3 is a representative sensor signal resulting from a precipitation pattern of widely dispersed large rain drops. The sensor signal characteristic of FIG. 3 indicates one large rain drop falling on the monitored portion, resulting in the value of the other of the two counter elements changing once during the acquisition period. If during the acquisition period, the sensor signal falls below the connection threshold $TH_{CONN}$, a wiping cycle is triggered. After a wiping cycle triggered in said manner, if the sensor signal remains at a constantly high level (e.g. clean windshield), a new wiping cycle is automatically triggered after a specific period of time. If, as a result of precipitation, the sensor signal falls below the connection threshold for wiper operation in the time prior to the automatically subsequently triggered new wiping cycle, a wiping cycle is immediately initiated and the automatic wiping cycle is not executed. Instead, the two counter elements are re-evaluated by the microprocessor 26 according to the process described above and a new wiping strategy adapted thereto is determined.

Naturally, in practice, rain forms also occur which differ from the two idealized examples discussed above. Thus, it may of course happen that during an acquisition period, as a result of simultaneous precipitation of small and large drops, both counter elements each undergo a change in value. In such a case, shortly before initiation of the wiping cycle to be triggered, the contents of the two counter elements are related to one another by the circuit arrangement 16, which includes means for implementing a weighting code for determining whether an extra wipe is to be made perhaps without the sensor signal crossing the connection threshold. In the preferred embodiment, the microprocessor 26 compares the number large drops detected, increased by a predetermined factor (such as four), to the number of small drops detected. If the number of small drops exceeds the modified number of large drops, no wipe is initiated. If, however, the modified number of large drops detected exceeds the number of small drops detected, a wipe cycle is initiated.

For further rain pattern detection processes and control processes of the windshield wiping system, the two counter elements are evaluated in each case shortly after the start of the triggered wiping cycle, the wiping strategy is determined and the counter elements are reset to their initial value zero. Thus, desired operation of the windshield wiping system, i.e. operation tuned particularly sensitively to various different rain patterns, is achieved.

It is understood, of course, that while the form of the invention herein shown and described constitutes the preferred embodiment of the invention, it is not intended to illustrate all possible forms thereof. It will also be understood that the words used are words of description rather than limitation, and that various changes may be made without departing from the spirit and scope of the invention.

I claim:

1. An apparatus for controlling a vehicular windshield wiping system including at least one windshield wiper, the apparatus including a sensor mounted to the windshield for monitoring a portion of the windshield wiped by the wiper during each wipe cycle, the sensor generating a sensor signal having a value which varies as a coating collects on the monitored portion, the apparatus further comprising;

detecting means for recognizing at least two rain patterns based on the change in an amplitude of the sensor signal over a predetermined period of time the detecting means including a first counting means an d a second counting means, the first counting means having a value which is incremented based on variations in the sensor signal due to a first rain pattern, the second counting means having a value which is increased based on variations in the sensor signal due to a second rain pattern; and means for activating the windshield wiping system for a wipe cycle according to the recognized rain pattern.

2. The apparatus of claim 1 further comprising means for comparing the value of the first counting means and the value of the second counting means according to a predetermined weighting code, so as to detect hybrid rain patterns.

3. The apparatus of claim 1 wherein during a wipe cycle, the wiper leaves a resign position and wipes over the monitored portion of the windshield at least twice, and wherein the detecting means recognizes rain patterns based on the sensor signal during an acquisition period of time between the at least one wiper passing the monitored portion for the last time during a wipe cycle and initiation of a new wiping cycle.

4. The apparatus of claim 2 wherein the first and second counting means are initialized to a value of zero when the windshield wiping system is activated.

5. The apparatus of claim 1 wherein the predetermined period of time is about 10 milliseconds.

6. The apparatus of claim 1 wherein the detecting means includes means for defining a fixed limit value, the detecting means recognizing the at least two rain patterns based on whether the amplitude change in the sensor signal exceeds the fixed limit value during the predetermined period of time.

7. The apparatus of claim 1 wherein the first counting means has a value which is incremented based on changes in the amplitude of the sensor signal, due to a first rain pattern, which do not exceed the fixed limit value, and the second counting means has a value which is incremented based on changes in the amplitude of the sensor signal, due to a second rain pattern, which exceed the fixed limit value.

8. The apparatus of claim 7 wherein the predetermined period of time is 10 milliseconds.

9. A method for controlling a vehicular windshield wiping system including a motor, a first counting means and a second counting means, and at least one windshield wiper, the method comprising:

monitoring a portion of the windshield wiped by the wiper during a wipe cycle;

generating a signal having a value which varies as a coating collects on the monitored portion of the windshield;

detecting at least two rain patterns based on a change in an amplitude of the sensor signal over a predetermined period of time by incrementing the first counting means based on variations in the signal due to a first rain pattern and incrementing the second counting means based on variations in the signal due to a second rain pattern; and activating the windshield wiping system for a wipe cycle according to the recognized rain pattern, so that the wiper leaves a resting position and wipes the windshield.

10. The method of claim 9 wherein detecting further comprises:

defining a fixed limit value, the at least two rain patterns being detected based on whether the amplitude change in the sensor signal exceeds the fixed limit value during the predetermined period of time.

* * * * *

UNITED STATES PATENT AND TRADEMARK OFFICE
CERTIFICATE OF CORRECTION

PATENT NO. : 5,319,293
DATED : June 7, 1994
INVENTOR(S) : Juergen Levers

It is certified that error appears in the above-indentified patent and that said Letters Patent is hereby corrected as shown below:

On the title page, insert --[30] Foreign Application Priority Data

German application No. P 41 41 348.2, filed 14 December 1991
German application No. P 42 31 763.0, filed 23 September 1992--

Signed and Sealed this

Eleventh Day of April, 1995

Attest:

BRUCE LEHMAN

Attesting Officer

Commissioner of Patents and Trademarks